Oct. 11, 1949.
W. CASTEDELLO
2,484,072
REFLECTING RANGE FINDER HAVING UNIFORMLY CALIBRATED SCALE
Filed Nov. 2, 1944
2 Sheets-Sheet 1
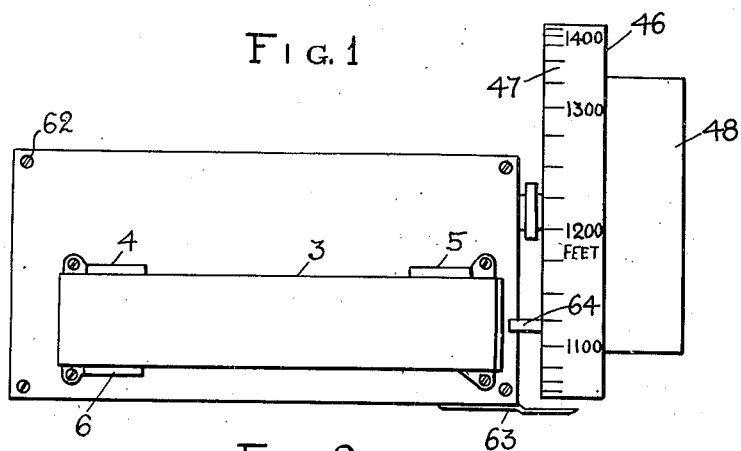
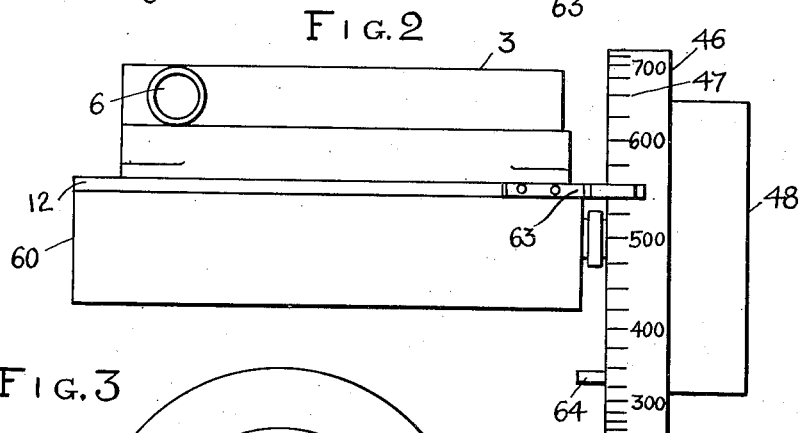
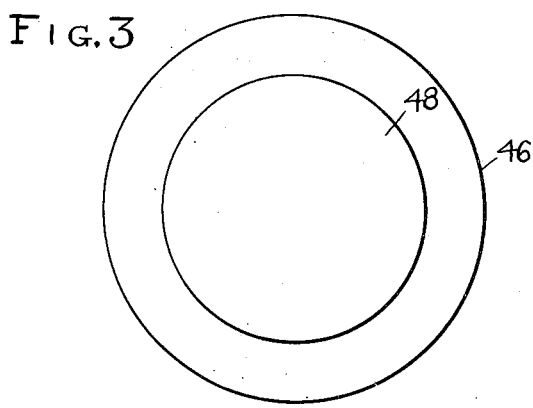
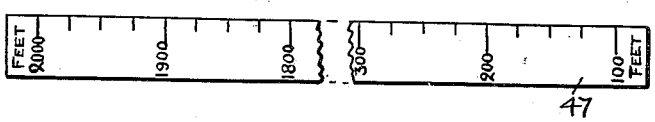
WILLIAM CASTEDELLO
INVENTOR
ATTORNEY Oct. 11, 1949.   W. CASTEDELLO   2,484,072
REFLECTING RANGE FINDER HAVING
UNIFORMLY CALIBRATED SCALE
Filed Nov. 2, 1944   2 Sheets-Sheet 2

INVENTOR
WILLIAM CASTEDELLO
BY
ATTORNEY

Patented Oct. 11, 1949

2,484,072

UNITED STATES PATENT OFFICE 2,484,072

REFLECTING RANGE FINDER HAVING UNIFORMLY CALIBRATED SCALE

William Castedello, Stamford, Conn., assignor to The Kalart Company, Inc., Stamford, Conn.

Application November 2, 1944, Serial No. 561,558

2 Claims. (Cl. 88—2.4)

This invention relates to improvements in measuring devices, particularly to improvements in measuring devices including an indicator having a scale calibrated in units to be measured.

Measuring devices of this type usually comprise a movable element the position of which is controlled by variations of the unit to be measured and which in turn controls the indications of the indicator. The movements of the movable element are transmitted to the movable part of the indicator by any suitable means which may be of an electrical or mechanical type. As is well known in the art, the indications of the indicator, which are effected by the transmitter means in response to a given change of the unit to be measured, follow in many types of measuring devices a logarithmic or other exponential curve rather than a straight line; or in other words, a given change of the unit to be measured will cause a different displacement of the movable part of the indicator at different portions of the indicator scale. As a result, the indicator scale cannot be calibrated uniformly or evenly but will be crowded at certain portions of the scale, usually at the beginning or the end of the scale. This has the disadvantage that readings at the crowded portion or portions of the scale are bound to be inaccurate or at least less accurate than at spread portions of the scale.

One of the objects of the invention is to provide means permitting a desired calibration of the indicator scale; that is, the scale may be uniformly or evenly calibrated over its entire range, or the calibration may be expanded at critical portions of the scale or crowded at less important portions of the scale.

Another object of the invention is to provide means compensating for the varying indications caused by the transmitter means in response to a given change of the unit to be measured, thereby allowing the use of a calibration following a straight line or a desired curve rather than a logarithmic or exponential curve.

Another object of the invention is the provision of means resulting in an extremely accurate indication on the indicator in response to changes of the unit to be measured.

Other and further objects, features and advantages of the invention will appear hereinafter and in the appended claims forming part of the specification.

An important and preferred field of application of the invention are range finders comprising a stationary reflecting means and an adjustable reflecting means, each of these means being arranged to reflect one image of the object to be observed, the image reflected by the adjustable reflecting means being projected upon the stationary reflecting means.

In order to measure the distance between an object and the position of an operator with range finders of this type, the operator will observe the two images of the object as viewable on the stationary reflecting means and adjust the angular position of the adjustable reflecting means so that the image projected by the adjustable reflecting means is brought in a pre-determined relative position to the second image seen through the stationary reflecting means. The angular position of the adjustable reflecting means, being indicative of the distance between the object and the operator, is then used to ascertain the distance to be determined by means of the indicator which is preferably calibrated in units of range or distance. It is of course also possible to couple the range finder with the adjustable lens carrier of a photographic camera and then to focus directly by means of the range finder as it is well known in the pertinent art.

The range finders of the type described may be either "short range-range finders" or long range-range finders."

Short range-range finders as herein referred to may be of the split-image type or of the super-imposed image type. In range finders of these and similar types the reflecting means are usually adjusted so that the correct distance is indicated when the two observed images appear super-imposed in range finders of the super-imposed image type, or in register in range finders of the split image type. Short range-range finders are frequently used in photographic work to facilitate the focusing of the camera lens. They are reasonably accurate within a range up to a few hundred yards. This limited range is substantially due to the fact that the base of the range finder is a very short one, usually about a few inches. Hence light beams reaching the reflecting means from an object located beyond a certain distance are practically parallel and the two images will appear to be super-imposed or in register for any distance beyond a certain range.

Long range-range finders as herein referred to are range finders in which usually the angular positions of the reflecting means are adjusted so that the two images of an object appear to an observer in an end to end position instead of in a super-imposed or registered position when the range finder is set for the correct distance of the object. Range finders of this type require that at least one dimension of the object is known. It has been found that with range finders of the last mentioned type accurate results can be obtained within a range that is a multiple of the range which can be accurately covered with a short range-range finder. Long range-range finders of the type previously described are described more fully in my co-pending application Ser. No. 545,600, filed July 19, 1944, now Patent No. 2,401,746, dated June 11, 1946.

Both, short range-range finders unless they are camera coupled and long range-range finders are conventionally equipped with indicating means having a scale calibrated in units of distance such as feet or yards.

As it will be apparent, in such range finders the angular movement of the adjustable reflecting means such as a mirror corresponding to a given change in distance will vary for different distances. The angular displacement of the adjustable mirror for a given change of distance will decrease the more the object is removed from the range finder. Consequently, the changes of the movable part of the indicating means will become progressively smaller, or in other words the calibrations of the indicating means will become more and more crowded towards the portion of the scale assigned to the greater distances, hence the readings on the indicating means will become more and more inaccurate.

As previously explained, one of the main objects of the invention is to permit a desired calibration of the scale of the indicating means. This object is accomplished in application to range finders of any type by providing means for effecting progressively increasing changes in the indications of the indicating means in response to progressively decreasing angular displacements of the adjustable mirror. It will now be obvious that by proper adjustment of the varying indications in response to varying angular displacements of the adjustable mirror a uniform or substantially uniform calibration of the scale of the indicating means can be attained.

In the accompanying drawings an embodiment of the invention, to wit an application of the invention to a range finder is shown by way of illustration and not by way of limitation.

Fig. 1 is a diagrammatic plan view of a range finder according to the invention.

Fig. 2 is a rear elevational view of Fig. 1.

Fig. 3 is a side view of Fig. 1.

Fig. 5 is a development of the scale of the indicating means of the range finder.

Figure 4:
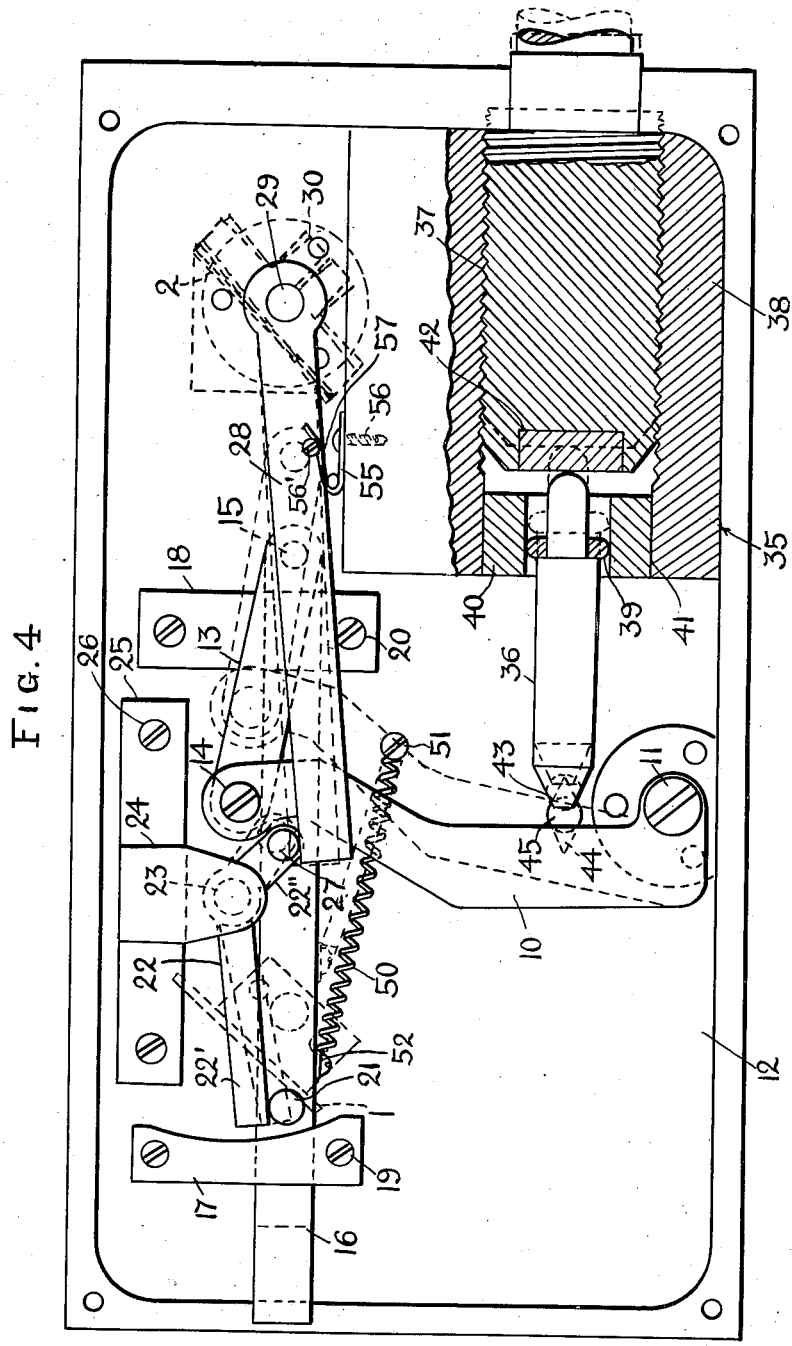
Fig. 4 is a sectional plan view of a range finder according to the invention on an enlarged scale.

A range finder according to the invention comprises a stationary semi-transparent reflector 1 for example a mirror made semi-transparent by silver coating the surface of the mirror only partly or evenly and a pivotal reflector 2 for example a mirror having a solidly silvered surface. Both the mirrors are arranged in a case 3 having two object windows 4 and 5 in front of the mirrors and an observation window 6 in the rear of the case through which the two images viewable by means of mirror 1 may be observed.

The angular position of pivotal mirror 2 relative to stationary mirror 1 is controlled by means of a pivotal lever 10 which is pivotally mounted by means of a pivot 11 on a base plate 12. Lever 10 is pivotally coupled to a second pivotal lever 13 by means of a pivot 14. Lever 13 is pivotally connected by means of a pivot 15 to a bar 16, which is axially slidable and supported in bearings 17 and 18 fastened by suitable means such as screws 19 and 20 to base plate 12. Bar 16 has preferably an unround cross section such as a square cross section to prevent a turning of the bar and supports a pin 21. This pin cooperates with a bell crank 22 having two arms 22' and 22'', arm 22' being in engagement with pin 21. Bell crank 22 is pivoted about pivot 23 supported by a bracket 24 mounted on base plate 12 by any suitable means, for instance by means of a plate 25 fastened to base plate 12, by screws 26 or other suitable means.

Arm 22'' engages, preferably by means of a pin 27 supported by arm 22'', a pivotal lever 28 which is pivoted about a pivot 29 and mounted on base plate 12 by any suitable means such as a plate 30 fastened to base plate 12. Adjustable mirror 2 is fixed to lever 28 so that any angular movement of the mirror 2 will result in corresponding movement of lever 28 and vice versa.

The angular movement of pivotal lever 10 is controlled by adjustment means generally designated 35. This adjustment means comprises a floating rod 36 engaging at one end lever 10 and engaged at the other end by a screw member 37 threaded into a block 38 fastened to base plate 12. Screw member 37 can of course be adjustably arranged in any other suitable manner. Rod 36 is provided with a collar 39 which is guided by means of a guiding sleeve 40 inserted in a suitable recess 41 of block 38. The end of rod 36 engaging screw member 37 is preferably tapered or rounded in order to provide a well defined bearing point. A piece 42 of hard metal or any other suitable material may be inserted in the engaging surface of screw member 37 to take the wear caused by the pressure of rod 36 against screw member 37.

The end of rod 36 engaging lever 10 may be recessed at 43 and a corresponding recess 44 may be provided in lever 10. These recesses 43 and 44 serve to receive a ball 45, made of a hard metal or any suitable material. The purpose and advantage of this arrangement are to secure a well defined bearing point at which lever 10 is engaged by rod 36.

Screw member 37 supports a knob 46 by means of which screw member 37 can be rotated. The periphery of any other suitable portion of knob 46 bears a scale 47 calibrated in units of distance, for instance in yards. In the embodiment shown by way of illustration and not by limitation the scale is calibrated for a range between 100 and 2000 feet as indicated in Fig. 5. In order to facilitate rotation of knob 46 without covering part of the scale by the hand of the operator a projection 48 may be provided serving as a handle.

As will be apparent from the drawings a rotation of knob 46 deeper into the thread of block 38 will cause a pivotal movement of lever 10 in a counter-clockwise direction. In order to cause lever 10 to make a movement in the opposite direction when knob 46 is rotated to be moved out of block 38, a loaded spring 50 is provided which is fastened at one end by a pin 51 on base plate 12 and at the other end to axially slidable bar 16, for instance by means of a screw 52. The spring 50 will consequently urge bar 16 towards the right in the drawings thereby causing lever 10 which is pivotally coupled to bar 16 through lever 13 to follow a movement of rod 36 toward the right.

A second loaded spring 55 is provided which is fastened at one end, for instance by means of a screw 56 to block 38 and rests with its other end 57 against pivotal lever 28 for example by means of a pin 56'. This spring will urge lever 28 to pivot in a clockwise direction thus pressing lever 28 into engagement with pin 27 supported by arm 22" of bell crank 22 which in turn will be urged to rotate in a counterclockwise direction thereby maintaining a tight engagement between arm 22" and pin 21 supported by bar 16.

The entire assembly is encased in a case 60 which may be fastened to base plate 12 by any suitable means such as screws 62.

Base plate 12 or any other suitable stationary part of the range finder such as case 60 supports a pointer 63 extending over scale 47 on knob 46 and serving as an index for the scale. A pin or projection 64 is fastened to knob 46 and serves as a stop to limit the rotation of knob 46 to somewhat less than one revolution by resting against base plate 12 after completion of substantially one revolution in either direction.

As previously mentioned a range finder as illustrated in the drawings may be either a short range-range finder or a long range-range finder, the difference residing substantially in the angular adjustment of mirrors 1 and 2 and in the calibration of the scale. In the first mentioned case the correct distance is indicated when the two images observed through observation window 6 appear super-imposed or in register in case of split-image type range finders, while in the last mentioned case the correct distance of the object will be indicated when the two images appear in an end to end position.

For the purpose of explanation it will be assumed that a long range-range finder is illustrated. Such range finder can be calibrated for any given object or target having at least one known dimension by the following procedure: A base line of the desired length, for example 54 feet is marked out on any convenient background. The desired minimum range, for example 100 feet is then measured from the baseline at 90° to the base line. The operator now sights through the observation window 6 holding the instrument in a preferably horizontal position and rotates knob 46 until the true image of the base line that is visible through the semi-transparent mirror 1 and the second image reflected to mirror 1 from mirror 2 appear in an end to end position to the eye of the operator. The scale 47 on the periphery or any other suitable part of the knob 46 is now marked accordingly opposite pointer 63. The next desired range is then measured off and the operator resights the range finder for the base line in a similar manner. The knob scale is again marked to indicate the new range. This procedure is repeated while increasing the range as desired until the entire desired range is covered. The knob is now calibrated with a scale permitting measuring the distance of a target having a certain known dimension.

The operation of the range finder is as follows:

Assuming knob 45 is rotated in a direction to cause rod 36 to move away from lever 10, then spring 50 will force bar 16 to slide toward the right, thereby rotating lever 10 in clockwise direction while maintaining engagement between the lever 10 and rod 36 as has been shown in dotted lines. Pin 21 secured to bar 16 will also be displaced toward the right until it reaches the position indicated in dotted lines. Due to the action of loaded spring 55 the entire lever system will follow this displacement of pin 21 and bell crank 22 and lever 28 will assume the positions shown in dotted lines thereby causing a corresponding angular movement of pivotal mirror 2.

When the knob 46 is rotated in the opposite direction causing a pivotal movement of lever 10 in a counter-clockwise direction pivotal mirror 2 will be rotated in the opposite direction.

As will be apparent from the previous description and an examination of Fig. 4, the angular movement of mirror 2 in either direction in response to a given angular movement of lever 10 will be determined by the effective length of the lever arms of the lever system. Consequently, a change of the effective length of one or more of the lever arms of the system will cause a change in the angular displacement of mirror 2 in response to a given angular movement of lever 10.

According to the invention the effective length of arm 22' of bell crack 22 is variable. The effective length of this arm is determined by the distance between the point at which arm 22' engages pin 21 and the pivot 23. This effective length is changed by an axial displacement of bar 16. The positions of the various elements which are shown in the drawing in full lines represent the position in which the effective length of arm 22' is substantially at a maximum so that a movement of bar 16 towards the right will result in a progressive decrease of the effective length of arm 22'. As a result a given angular movement of lever 10 will cause progressively increasing angular movements of mirror 2. The position shown in full lines corresponds substantially to the maximum distance say of 2000 feet and the dotted position is an intermediate position, the positions for still shorter distances will then be to the right of the dotted position.

As will be obvious, the required angular displacement of mirror 2 for a given change of the distance of the object is determined by the distance of the object from the range finder. The closer the object is, the greater will be the angular movement of mirror 2 that is required to bring the two images appearing on stationary mirror 1 in an end to end position.

This effect is used to attain the desired substantially uniform calibration of the scale.

According to the invention the variations in the effective length of arm 22' and hence the variations in the angular displacement of mirror 2 in response to a given pivotal movement of lever 10 are selected and adjusted so that an angular movement of lever 10 representing a certain indication of distance, say 100 feet on the indicator scale will always result in an angular displacement of mirror 2 required for bringing the two images in the desired end to end position; or in other words the angular displacement of mirror 2 corresponding to a given change in distance, say 100 feet that is required to bring the two images in the proper end to end position will entail a substantially uniform angle of rotation of knob 46 for the entire range of distance covered by range finder.

It will now be apparent that the previously described variable range of transmission of the lever system permits a substantially uniform calibration of the indicator scale. The development shown in Fig. 5 illustrates such substantially uniform scale for a range between 100 and 2,000 feet.

It will further be obvious that numerous other desired calibrations can be provided, for instance a certain section of the scale which is particularly critical may be expanded. All this can be accomplished by suitable variations of the rate of transmission in response to a change of one or more of the effective lengths of one or more of the lever arms.

While the invention has been described in detail with respect to certain preferred examples and embodiments it will be understood by those skilled in the art after understanding the invention, various changes and modifications may be made without departing from the spirit and scope of the invention and it is intended therefore in the appended claims to cover all such changes and modifications.

What is claimed as new and desired to be secured by Letters Patent is:

1. A range finder comprising a stationary reflector and a pivotal reflector for viewing objects exterior to said range finder, one image of an object being reflected by said pivotal reflector to said stationary reflector and a second image being viewable through said stationary reflector, a first pivotal lever, a second pivotal lever connected with the pivotal reflector for controlling the angular position of the said reflector, an axially movable bar having a lateral projection extending from it at an angle to the axial bar movement, said bar being operatively connected with the first pivotal lever for axial displacement of the bar in response to a pivotal movement of the first pivotal lever, a pivotally supported bell crank, the first arm of the bell crank slidably abutting at an intermediate point of its length against said projection, the second arm slidably abutting against said second pivotal lever, spring means arranged to pivot the second pivotal lever toward engagement with the second bell crank arm, thereby causing pivoting of the bell crank in response to an axial displacement of said bar ensuring axial displacement of the projection relative to the first bell crank arm and a corresponding pivoting of the second pivotal lever against the action of the spring means, means for pivoting the first pivotal lever, and an indicating means associated with the pivoting means, said indicating means having a scale calibrated to indicate the correct object range in response to the pivotal reflector being placed in an angular position causing said two images to be viewable in a predetermined relative position to each other, said axial displacement of the projection of the bar varying the intermediate point at which the first bell crank arm abuts against said projection, thereby causing a different effective length of the first bell crank arm for different positions of the bar to vary the rate of change in the angular position of the second pivotal lever in response to a certain change in the angular position of the first pivotal lever, said variations in the rate of change being selected so as to match a substantially uniform calibration of the scale of the indicating means.

2. A measuring device of the type described comprising a movable element capable of being positioned corresponding to the unit to be measured, an adjustable indicating means having a scale calibrated in values of the unit to be measured, a first pivotal lever the angular position of which is controllable by adjustment of the indicating means, a second pivotal lever for controlling the angular position of the movable element, an axially movable bar, a third lever pivotally coupled with the first pivotal lever and the axially movable bar for causing an axial movement of the bar in one direction in response to an angular movement of the first pivotal lever, spring means connected with the bar and urging the same in opposite direction, a projection at the movable bar extending laterally therefrom at an angle to the axial bar movement, a pivotally supported bell crank, the first arm of the bell crank slidably abutting at an intermediate point of its length against said projection, the second arm slidably abutting against said second pivotal lever, and second spring means arranged to pivot the second pivotal lever toward an engagement with the second bell crank arm, thereby causing pivoting of the bell crank in response to an axial displacement of said bar ensuring axial displacement of the projection relative to the first bell crank arm and corresponding pivoting of the second pivotal lever against the action of the second spring means, said displacement of the projection relative to the length of said first bell crank arm varying the effective length of the first bell crank arm for different axial positions of the axially slidable bar, thereby varying the rate of change of the angular position of the second pivotal lever in response to a certain change in the angular position of the first pivotal lever, said variations in the rate of change being selected to match a substantially uniform calibration of the scale of the indicating means.

WILLIAM CASTEDELLO.

REFERENCES CITED

The following references are of record in the file of this patent:

UNITED STATES PATENTS

| Number | Name | Date |
| --- | --- | --- |
| 640,679 | Marshal | Jan. 2, 1900 |
| 921,137 | Michelson | May 11, 1909 |
| 1,178,474 | Becker | Apr. 4, 1916 |
| 1,703,386 | Boykow | Feb. 26, 1929 |
| 2,215,370 | Hineline | Sept. 17, 1940 |
| 2,284,831 | McCanlies | June 2, 1942 |
| 2,334,075 | Davenport | Nov. 9, 1943 |

FOREIGN PATENTS

| Number | Country | Date |
| --- | --- | --- |
| 11,677 | Great Britain | 1915 |
| 551,510 | Great Britain | Feb. 25, 1943 |